United States Patent
Kato

Patent No.: US 6,728,252 B1
Date of Patent: Apr. 27, 2004

(54) LSI CONTROL APPARATUS FOR COMMUNICATION, METHOD FOR CONTROLLING THE SAME, AND DISTRIBUTED CONTROL NET WORK SYSTEM HAVING COMMUNICATION LSI CONTROL APPARATUS

(75) Inventor: Yoshiyuki Kato, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/217,185

(22) Filed: Dec. 22, 1998

(30) Foreign Application Priority Data

Dec. 26, 1997 (JP) .............................. 9-366790

(51) Int. Cl.[7] ............................................. H04L 12/02
(52) U.S. Cl. ...................... 370/400; 370/466
(58) Field of Search ................. 370/465, 466, 370/467, 401, 402, 406, 407, 351, 352, 353, 354, 355, 356

(56) References Cited

U.S. PATENT DOCUMENTS

| 5,568,471 | A | * | 10/1996 | Hershey et al. ................ 370/17 |
| 5,568,525 | A | * | 10/1996 | de Nijs et al. ............... 370/356 |
| 5,754,552 | A | * | 5/1998 | Allmond et al. ............. 370/465 |
| 5,809,021 | A | * | 9/1998 | Diaz et al. ................... 370/364 |
| 5,953,340 | A | * | 9/1999 | Scott et al. .................. 370/401 |
| 6,151,390 | A | * | 11/2000 | Volftsun et al. ............. 379/229 |

* cited by examiner

Primary Examiner—Steven H. D Nguyen
Assistant Examiner—Duc Duong
(74) Attorney, Agent, or Firm—Finnegan, Henderson, Farabow, Garrett & Dunner, L.L.P.

(57) ABSTRACT

A control logic selects selecting means based on changeover information set in, for example, a switch and ROM, and communication is conducted by effecting a switching, by the selected switching means, to any of communication controllers stored in a communication LSI.

4 Claims, 12 Drawing Sheets

LSI CONTROL APPARATUS FOR COMMUNICATION, METHOD FOR CONTROLLING THE SAME, AND DISTRIBUTED CONTROL NET WORK SYSTEM HAVING COMMUNICATION LSI CONTROL APPARATUS

BACKGROUND OF THE INVENTION

This application is based on Japanese Patent Application No. 9-366790 filed Dec. 26, 1997, the content of which is incorporated herein by reference.

The present invention relates to a control apparatus for an LSI, such as a communication LSI, incorporating a plurality of communication controllers for use in a computer system, etc., connected to a communication network, etc., and adapted to conduct communication, a method for controlling a communication LSI, and a distributed control network system having a communication LSI control apparatus.

With a recent advance of an LSI fabrication technique, it has been possible to incorporate a large-sized circuit or circuits into an LSI at low costs. Under this situation, more number of pins need to be used for a package, thus imparting a greater influence to the cost of the LSI than the circuit size. The use of more pins results in more costs. In the communication LSI for use in a conventional computer system, etc., on the other hand, a dedicated I/O pin is required for each communication controller.

If, therefore, a greater number of communication controllers are incorporated into the LSI, mote I/O pins are required for the LSI and more costs are involved, thus presenting a problem. Further, the communication LSI is used for a general-purpose application and usually incorporates a CPU, multi-channel ROM/RAM controllers, etc., therein. These I/O pins, if being not used in the system, will become useless.

It is better and effective to develop LSIs in accordance with the system used. In this case, however, a vast cost is involved in the development of the LSIs.

BRIEF SUMMARY OF THE INVENTION

It is accordingly the object of the present invention to provide a control apparatus for an LSI, that is a communication LSI, having the function of allowing an I/O pin in the LSI to be switched in use to a communication port for specific communication controllers, suppressing the use of more I/O pins necessary to the LSI, enabling the mounting of an LSI package of less pins and ensuring a high general-purpose use at low costs, and a method for controlling a communication LSI and a distributed control network system having the communication LSI control apparatus.

In order to achieve the above-mentioned object of the present invention, a communication LSI control apparatus is provided which comprises communication control means for controlling communication in accordance with a plurality of different communication protocols, changeover information setting means for setting changeover information for selecting the communication control means, and selecting means for selecting the communication control means based on the changeover information set by the changeover information setting means and effecting a switching in a way to have the selected communication means correspond to a given I/O pin of the communication LSI.

According to the arrangement above, the communication control means corresponding to the different communication protocols is switched based on the set changeover information to correspond to a given I/O pin of the LSI. By doing so, it is possible to suppress the use of more I/O pins necessary to the LSI and, by doing so, to achieve a low-cost LSI package of less pins. Particularly, the present invention is useful for a communication LSI having communication control means adapted to at least one communication protocol for an information system network and a communication protocol for a control system network.

The present invention has the following arrangement so as to achieve the above-mentioned object.

The changeover information setting means is provided at an outside of the communication LSI and the setting of the changeover information is performed from the outside of the communication LSI.

When a computer system including the communication LSI is powered ON, the selecting means reads out the changeover information initially stored in the changeover information setting means and effects a switching of the communication control means based on the read-out changeover information.

Further, the selecting means switches the communication control means based on the control of a program for setting the changeover information initially set in the changeover information setting means.

When the computer system including the communication LSI is powered ON, the selecting means selects the communication control means based on a result of determination, by the communication control means, of a kind of communication network connected to the communication LSI.

Further, the present invention has the following arrangement in order to achieve the above-mentioned object.

A distributed control network system comprises a control client connected by a first communication protocol to a first communication network, a plurality of event-driven type distributed control microcomputers connected by a second communication protocol to a second communication network, and a local control server connected by the first communication protocol to the first communication network and adapted to control the distributed control microcomputer by the second communication protocol via the second communication protocol, the local control server having a communication LSI control apparatus, the communication LSI control apparatus comprising communication control means corresponding to the first and second communication protocols and adapted to control the communication, changeover information setting means for setting changeover information for switching the communication control means, and selecting means for selecting the communication control means based on the changeover information set by the changeover information setting means and for effecting a switching in a way to have the selected communication control means correspond to a given input/output pin of the communication LSI.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be explained below with reference to the accompanying drawing.

First Embodiment

Figure 1:
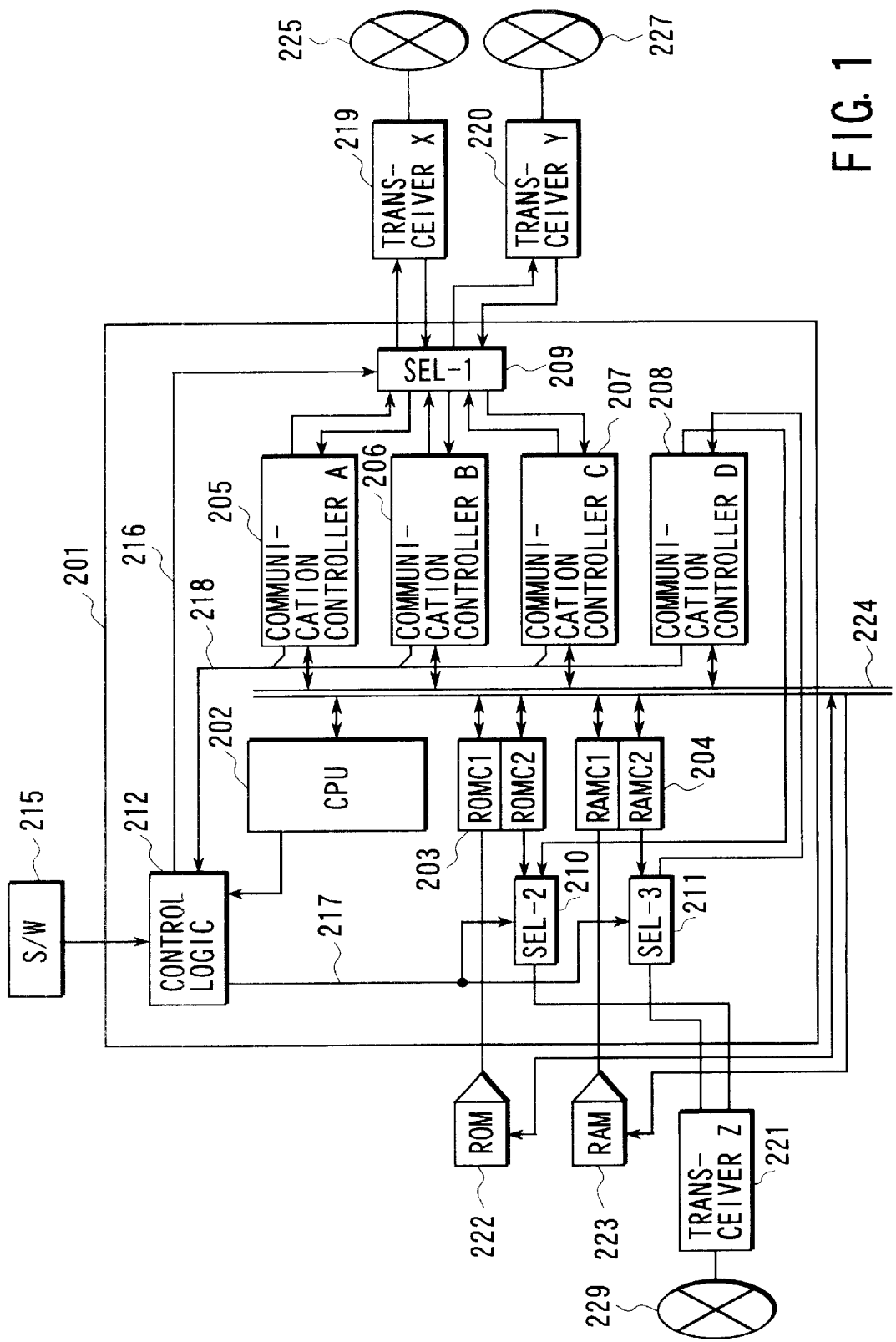
FIG. 1 is a block diagram showing an arrangement of a communication LSI according to a first embodiment of the present invention.

FIG. 1 is a schematic view showing a general arrangement of a computer according to a first embodiment of the present invention. An LSI 201 constitutes an LSI incorporating a CPU and plurality of communication controllers therein. The LSI 201 is incorporated in a communication system, etc., connected to networks, such as communication networks 225, 227, 229, to conduct communications to an outside.

A CPU 202 controls the processing of respective component parts in the LSI. A ROM controller 203 controls ROMs in two channels and a RAM controller 204 controls RAMs in two channels.

Communication controllers 205 to 208 constitute controllers for controlling communications and, here, support four kinds of communication protocols, such as Ethernet, TCP/IP, ISDN and LONTALK. Among them, Ethernet, TCP/IP and ISDN support the communication protocol for the information system network and supports the communication protocol for the control system network.

A selecting circuit 209 selects the two of the communication controllers 205 to 207. For example, the communication controllers, one for TCP/IP and one for LONTALK, are selected in the case where a global control server and local control server are connected via the internet and the local control server is connected to a plurality of control nodes via a control-system network such as the LONTALK. Selectors 210 and 211 perform a switching between the ROM controllers 203 and 204, on one hand, and the communication controller 208 on the other.

A control logic 212 supplies select information to the selector 209 on the basis of changeover information from a switch circuit 215 as will be set out below to allow two of the communication controllers 205, 206 and 207 to be selected. Further, the control logic 212 supplies select information to the selectors 210 and 211 to allow any of the ROM controllers 203 and 204 and communication controller 208 to be selected.

The switch circuit 215 is comprised of a hand-operated switch provided outside the LSI 201 to allow the changeover information of the selectors 209, 210 and 211 to be output to the control logic 212 through predetermined input pins.

A signal line 216 notifies the selecting circuit 209 of the information from the control logic 212. A signal line 217 notifies the selectors 210, 211 of the information from the control logic 212. And a signal line 218 notifies the control logic 212 of the information from the communication controllers 205, 206 and 208.

Transceivers 219, 220 and 221 connect the LSI 201 to a communication circuit.

ROM 222 stores a switching program executed by the CPU 202 as will be set out below. RAM 23 functions as a system memory.

A bus 224 allows a connection among the communication controllers 205, 206, 207, 208, CPU 202, ROM controller 203 and RAM controller 204 and a transfer of the information between these.

The four kinds of communication controllers 205, 206, 207 and 208 are incorporated in the LSI 201. Two of these communication controllers are selected by the selector 209 and the communication controllers are connected to predetermined I/O pins in the LSI 201.

The ROM controller 203 and RAM controller 204 enable their one-channel units to be switched to the communication controller 208. These switching controls are effected by the control logic 212 and performed before the communication controller is used.

In the embodiment so arranged as shown in FIG. 1, changeover information is set by the external switch 215 for the LSI 201 and an output of the switch 215 is supplied to the control logic 212 in the LSI 201 via the predetermined input pin.

Figure 2:
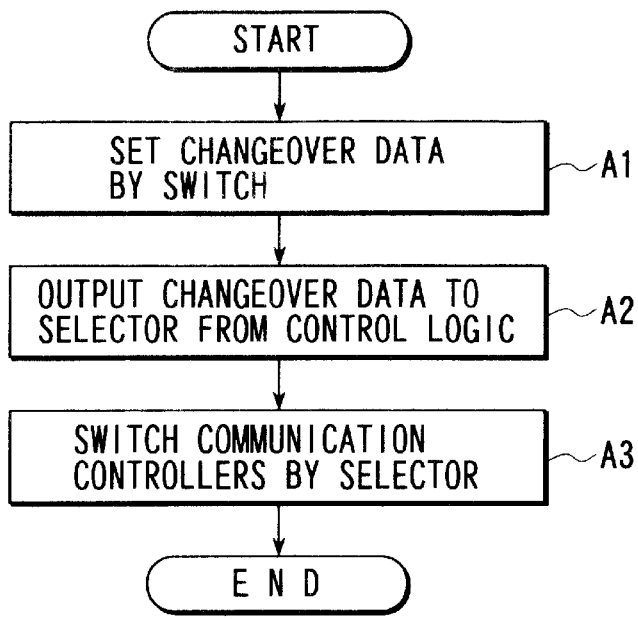
FIG. 2 is a flow chart showing the switching of communication controllers in the first embodiment of the present invention.

With reference to the flow chart in FIG. 2, an explanation will be given below about the processing operation of the first embodiment.

The changeover information (identification data for identifying any two of the communication controllers 205, 206 and 207 and identification data for identifying any of the ROM controller 203, RAM controller 204 and communication controller 208) are set by the switch 215 (step A1). The changeover information set by the switch 215 is input to the control logic 212 through the predetermined input pin of the LSI 201. The control logic 212 outputs control information to the selector 209 on the basis of the changeover information from the switch circuit 215 to allow the two of the communication controllers 205, 206 and 207 to be selected and the control logic 212 outputs control information to the selectors 210 and 211 to allow any of the ROM controller 203, RAM controller 204 and communication controller 208 to be selected (step A2). The selector 209 selects the two of the communication controllers 205, 206 and 207 on the basis of the control information and the selectors 210 and 211 selects a designated circuit out of the ROM controller 203, RAM controller 204 and communication controller 208 (step A3).

Second Embodiment

Figure 4:
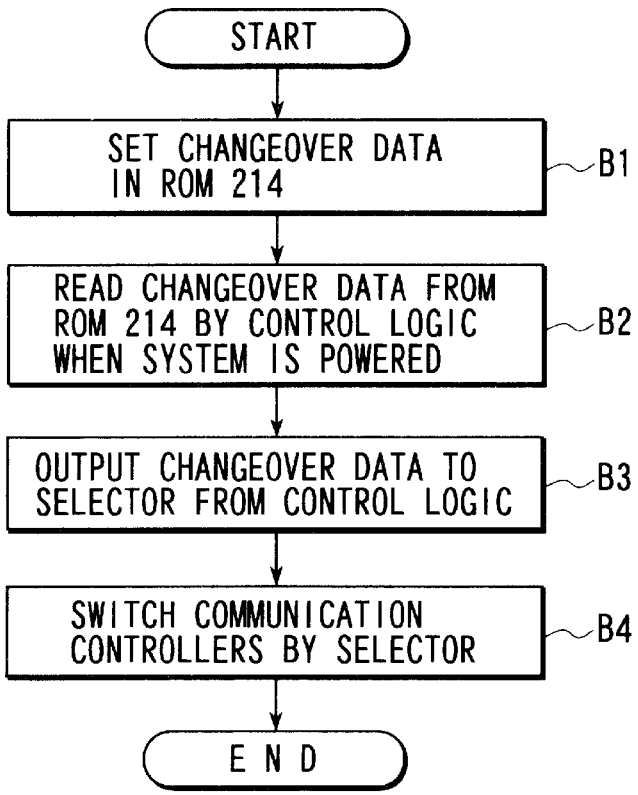
FIG. 4 is a flow chart showing the switching of communication controllers in the second embodiment.
Figure 3:
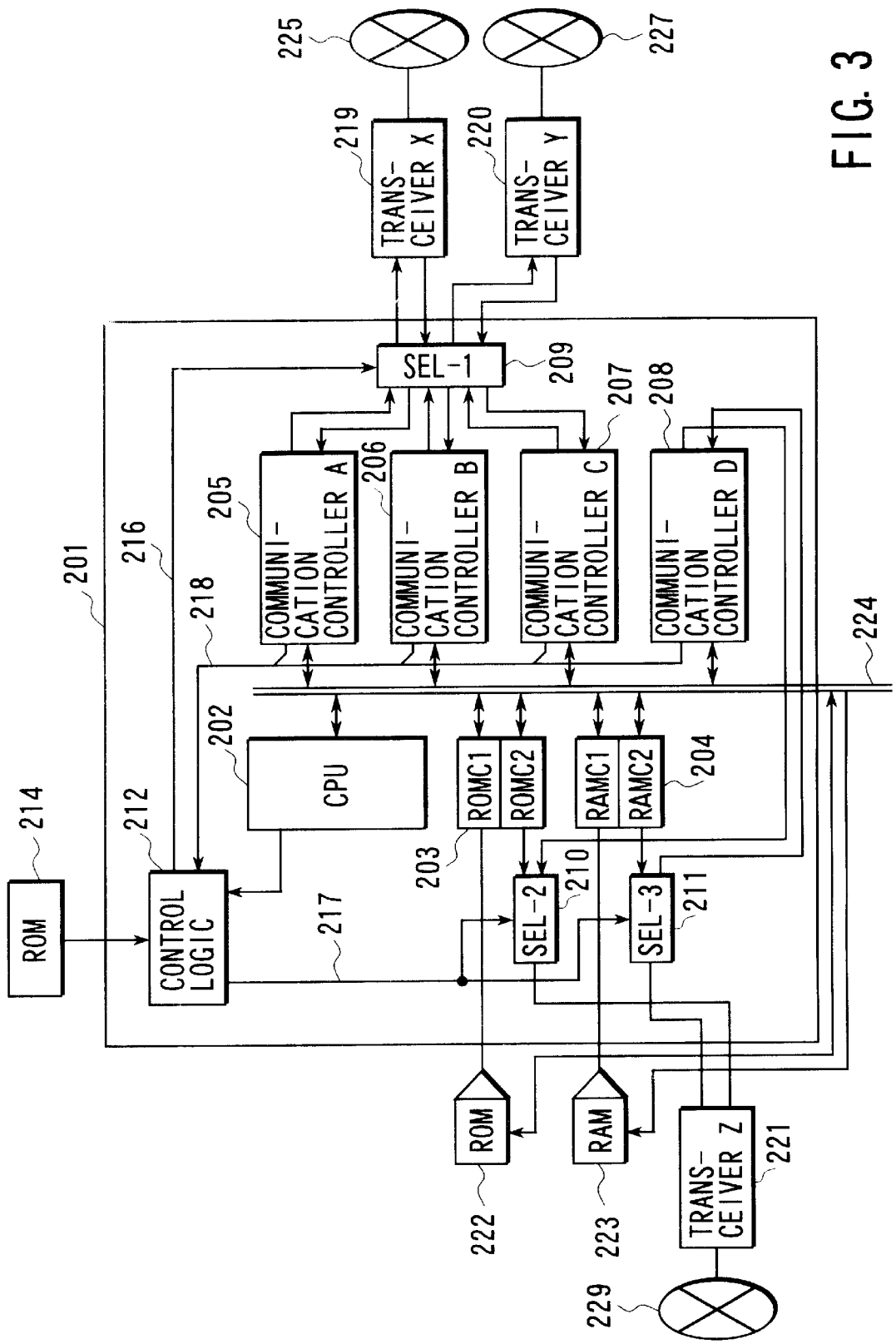
FIG. 3 is a block diagram showing an arrangement of a communication LSI according to a second embodiment of the present invention.

A second embodiment of the present invention will be explained below with reference to FIGS. 3 and 4. In the second embodiment, a changeover information is set in a ROM 214 connected to an outside of LSI 201 and a control logic 212 in the LSI 201 reads the changeover information out of the ROM 214 through a predetermined input pin to allow the changeover to be performed. As the ROM 214 use is made of a serial ROM, etc., of less I/O pins. At the starting of a system including the LSI 102, the control logic 212 reads the changeover information from the ROM 214 and the changeover is performed.

With reference to a flow chart of FIG. 4, an explanation will be given below about the processing operation of the second embodiment.

Initially, changeover information is set in the ROM 214 (step B1).

At the starting of the system, the control logic 212 reads out the changeover information (step B2).

Based on the read-out information, the control logic 212 outputs control information to the selector 209 to allow two of the communication controllers 205, 206 and 207 to be selected and the control logic 212 outputs control information to the selectors 210 and 211 to allow any of a ROM controller 203, RAM controller 204 and communication controller 208 to be selected (step B3). In accordance with this selected information, the selector 209 selects two of the communication controllers 205, 206 and 207 and the selectors 210 and 211 select a designated circuit of the ROM controller 203, RAM controller 204 and communication controller 208 (step B4).

Third Embodiment

Figure 5:
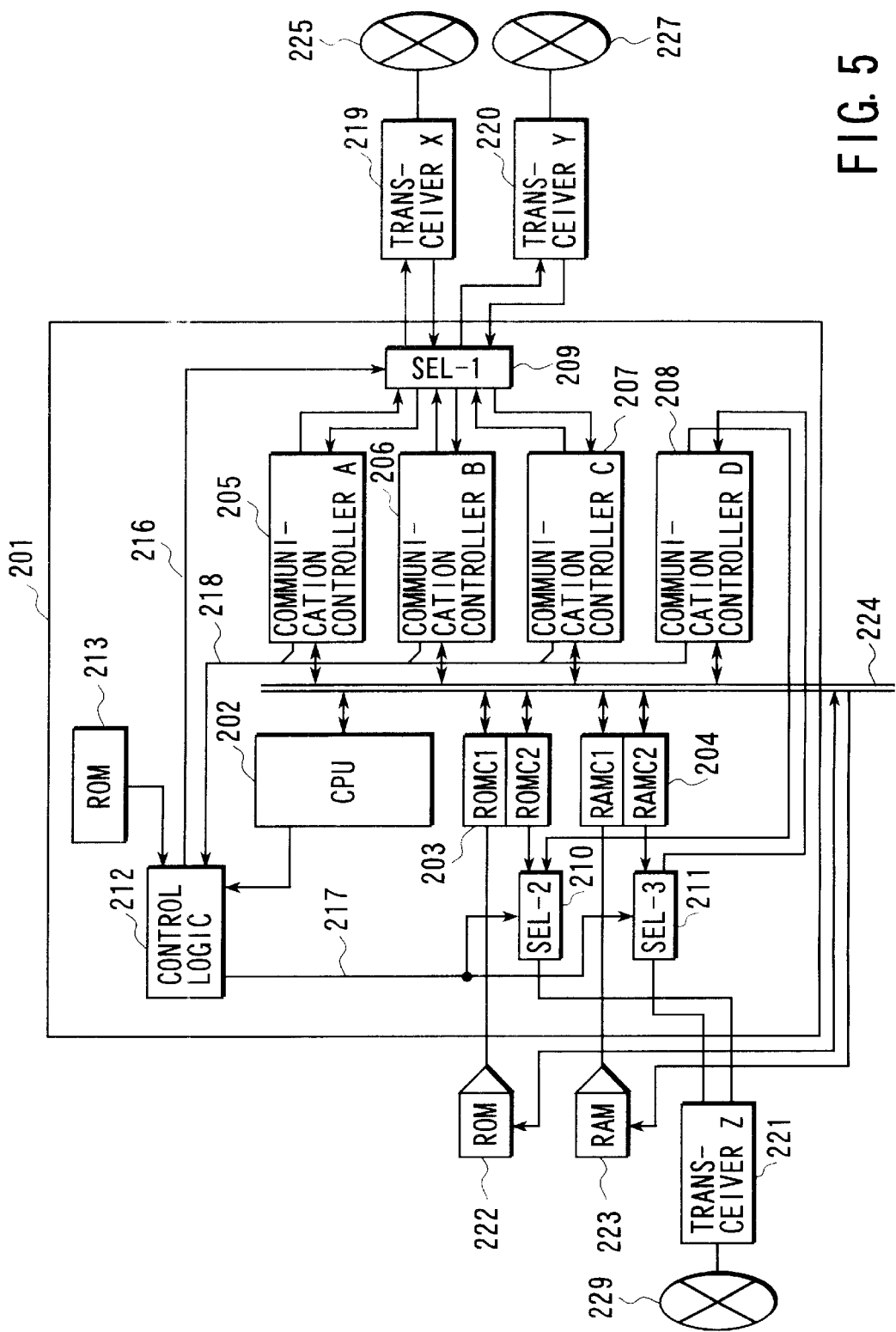
FIG. 5 is a block diagram showing an arrangement of a communication LSI according to a third embodiment of the present invention.
Figure 6:
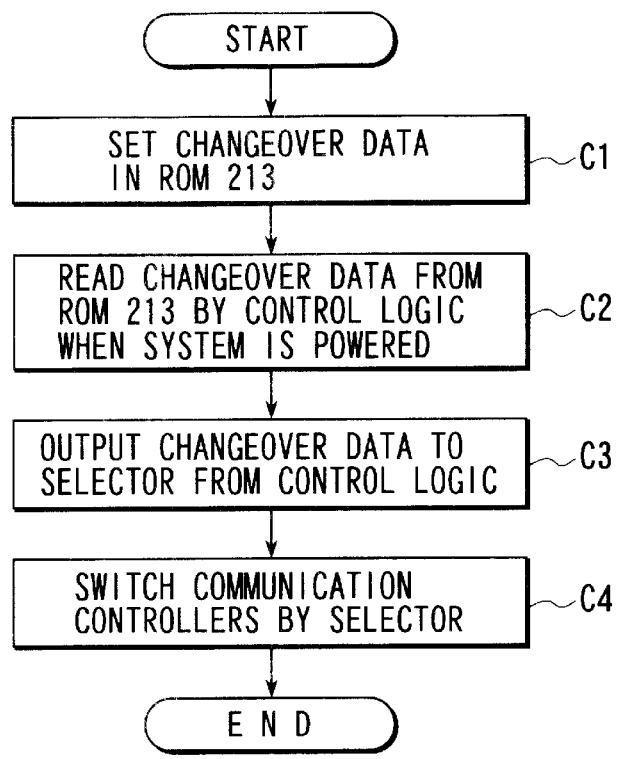
FIG. 6 is a flow chart showing the switching of communication controllers in a third embodiment.

With reference to FIGS. 5 and 6, an explanation will be given below about a third embodiment of the present invention.

In a third embodiment, a ROM (or EPROM) 213 is incorporated in an LSI 201 and initially changeover information is stored in the ROM 213. When a system including the LSI 201 is powered ON, a control logic 212 reads out changeover information from the ROM 213 and a switching is effected.

At a fabrication of the LSI 201, different functions of communication controllers are set in the ROM 213 and, by doing so, it is possible to create a plurality of LSIs of different functions in one kind of LSI.

In conjunction with a flow chart of FIG. 6 a detailed explanation will be given below about the processing operation of the embodiment above.

Initially, changeover information is set in the ROM 213 (step C1).

When the system is powered, the control logic 212 reads out the changeover information (step C2).

Based on the read-out changeover information, the control logic 212 outputs control information to a selector 209 to allow two of communication controllers 205, 206 and 207 to be selected and the control logic 212 outputs control information to selectors 210 and 211 to allow any of a ROM controller 203, RAM controller 204 and communication controller 208 to be selected (step C3). In accordance with the selected information, the selector 209 selects two of the communication controllers 205, 206 and 207 and the selector circuits 210 and 211 select a designated circuit of the ROM controller 203, RAM controller 204 and communication controller 208—step C4.

Fourth Embodiment

Figure 8:
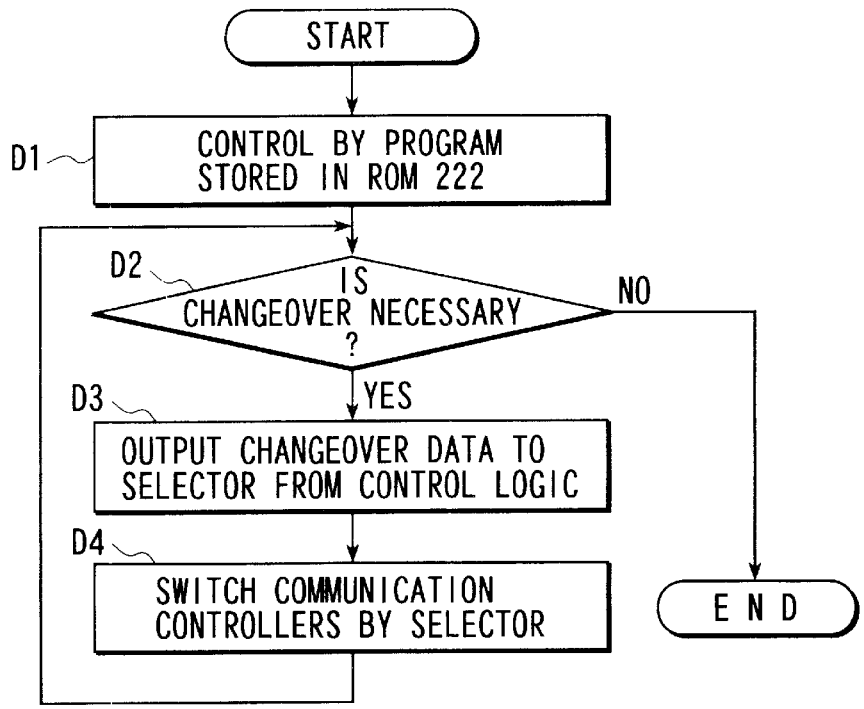
FIG. 8 is a flow chart showing the switching of communication controllers in the fourth embodiment.
Figure 7:
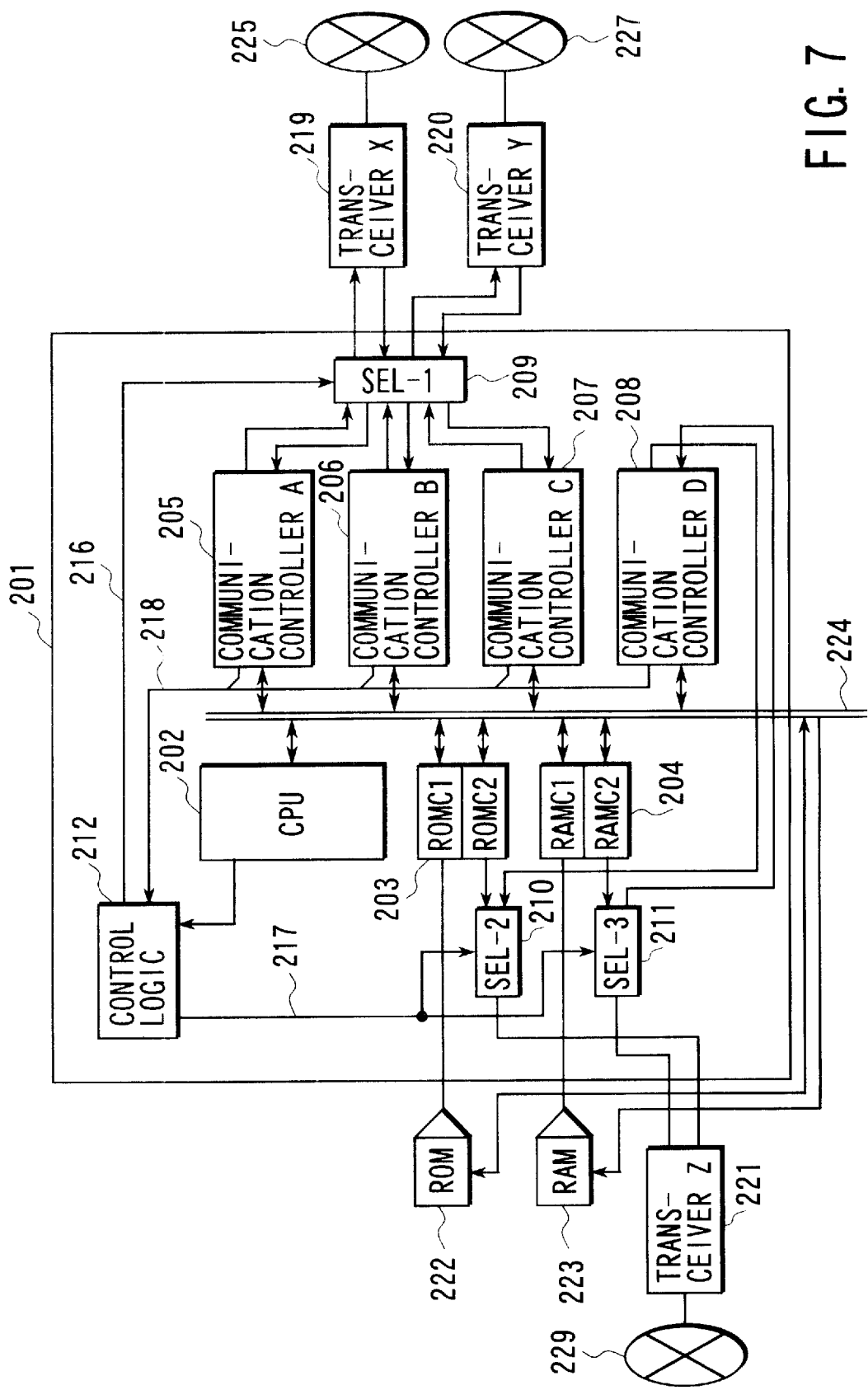
FIG. 7 is a block diagram showing an arrangement of a communication LSI according to a fourth embodiment of the present invention.

With reference to FIGS. 7 and 8, an explanation will be given below about the operation of the fourth embodiment.

In the fourth embodiment, a CPU 202 incorporated in an LSI 201 implements a predetermined switching control program and the changeover is carried out. The changeover information at this time is designated by a control program stored in a ROM 222 external to the LSI 201. The changeover timing is either when that system including the LSI 201 is powered ON or when an associated software is determined as being necessary.

With reference to a flow chart of FIG. 8 an explanation will be given below in detail about the processing operation of the fourth embodiment.

The CPU 202 controls a control logic 212 based on the program stored in the external ROM 222 (step D1). Then based on the program, the CPU 202 determines whether or not the changeovers of the communication controllers 205, 206 and 207, and a ROM controller 203, RAM controller 204 and communication controller 208, are necessary (step D2). This determination is carried out as follows. It is unclear which of transceivers 219, 220 and 221 are connected to the LSI 201. If, therefore, it is determined whether or not, for example, the changeovers of any particular one or ones of communication controllers 205, 206 and 207 are necessary, it may be possible that, for example, first two communication controllers 205 and 206 are selected to determine whether or not they can take a matching to externally connected transceivers 219 and 220, that is, whether or not data can be correctly read out. If not, the changeover is determined as being necessary.

If the changeovers of the communication controllers are determined as being necessary (Yes in step D2), then based on the determination result of the program the control logic 12 outputs control information to a selector 209 to allow the communication controllers 206 and 207 to be selected (step D3). The selector 209 selects the communication controllers 206 and 207 (step D4). And the determination of the above-mentioned step D2 is carried out. The above-mentioned steps D2, D3 and D4 are repeated until a matching is taken to the externally connected transceiver.

Fifth Embodiment

Figure 9:
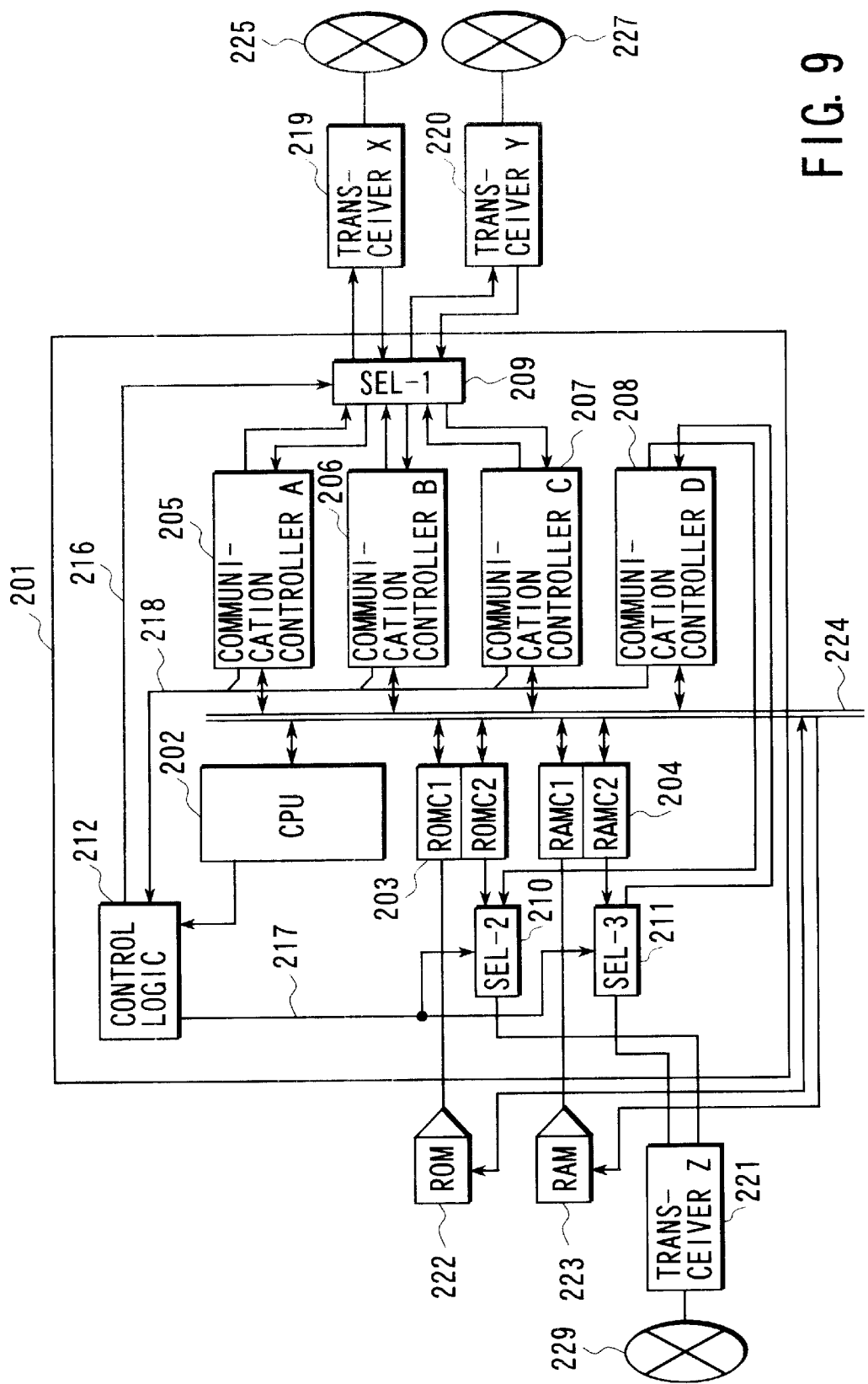
FIG. 9 is a block diagram showing an arrangement of a communication LSI according to a fifth embodiment of the present invention.
Figure 10:
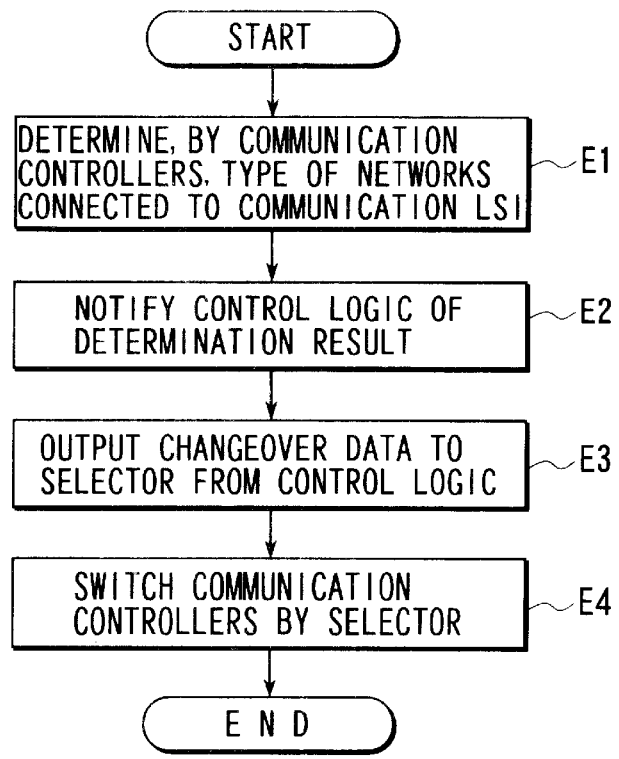
FIG. 10 is a flow chart showing the switching of communication controllers in a fifth embodiment of the present invention.

With reference to FIGS. 9 and 10 an explanation will be given below about a fifth embodiment of the invention.

In the fifth embodiment, at the powering-ON of a system including the LSI 201, a type of networks connected to a communication LSI is determined by the communication controllers 205 to 208 and a determination result is notified to the control logic 212. By doing so, automatic switching is so made as to allow the corresponding communication controller to be used.

With reference to FIG. 10 an explanation will be given below in detail about the processing operation of the fifth embodiment.

At the powering-ON of that system including the LSI 201, the type of networks connected to communication LSI 201 is determined by the communication controllers 205 to 208 (step E1). The communication controller involved notifies the control logic 212 of a result of determination (step E2).

The control logic 212 outputs control information to the selectors 209, 210, 211 on the basis of the result of determination (step E3). The selectors 209, 210, 211 select designated circuits out of the communication controllers 205, 206, 207 and 208 and ROM controller 203 and RAM controller 204 on the basis of given control information (step E4).

Sixth Embodiment

Figure 11:
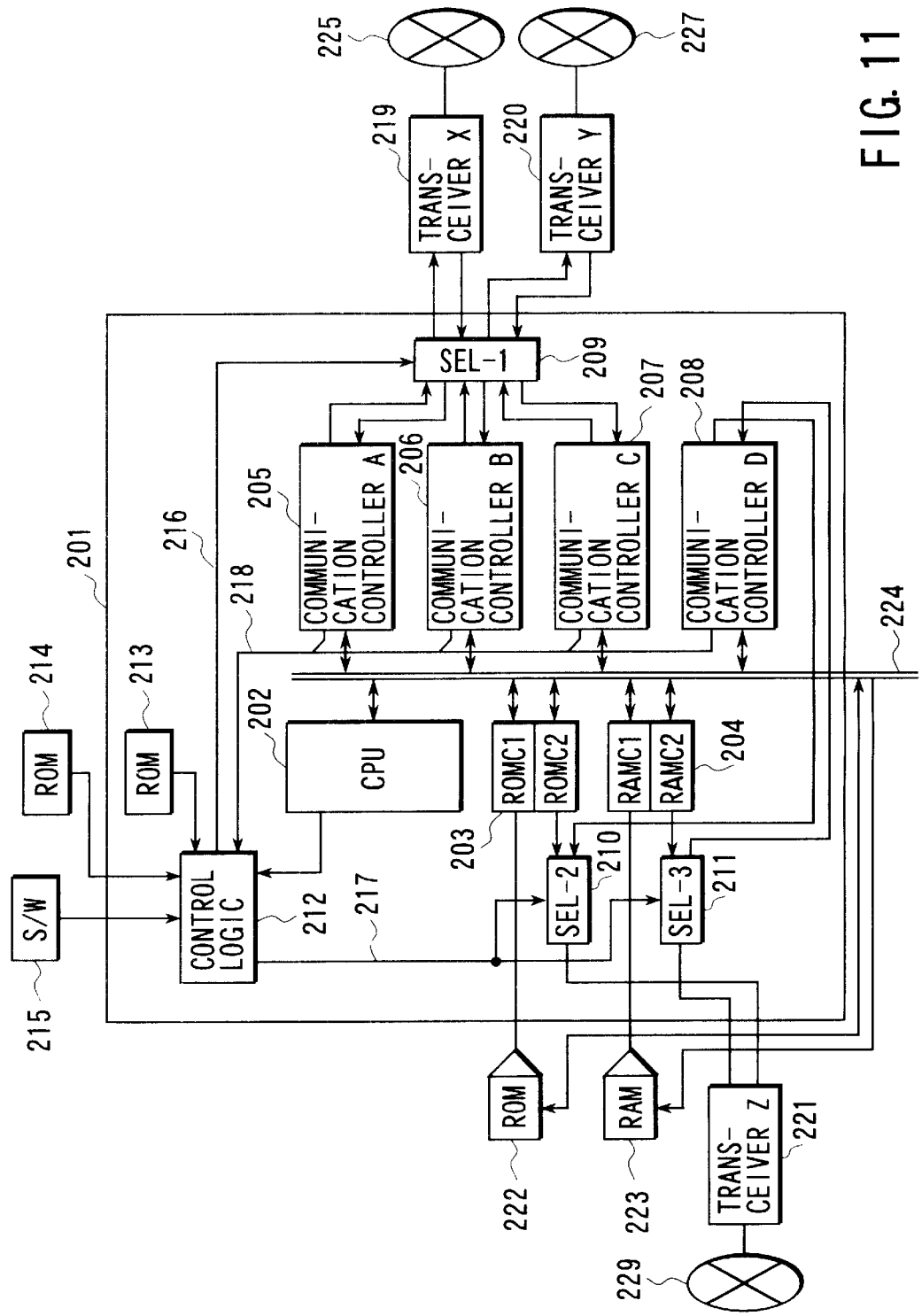
FIG. 11 is a block diagram showing an arrangement of a communication LSI according to a sixth embodiment of the present invention.

Although, in the above-mentioned respective embodiment, the changeover information has been explained as being designated by the switch circuit or initially stored in the memory, a sixth embodiment shown in FIG. 11 includes all of these functions, that is, includes a switch 215, external ROM 214 and incorporated ROM 213 and program ROM 222, and allows switchings to be made in accordance with the application. The changeover (switching) operations are the same as those of the above-mentioned embodiments and any further explanation is, therefore, omitted.

Seventh Embodiment

Figure 12:
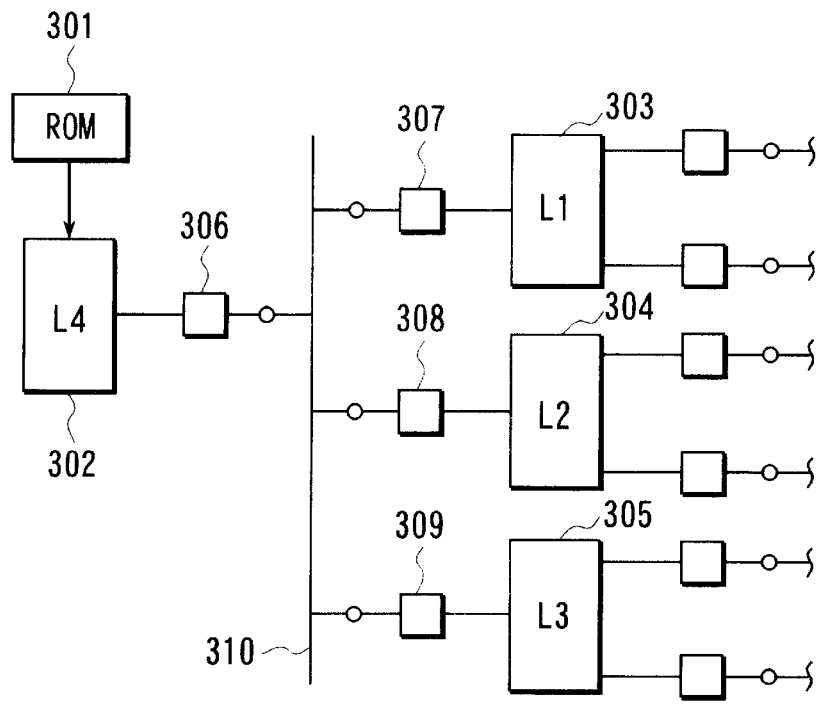
FIG. 12 is a block diagram showing an arrangement of a communication LSI according to a seventh embodiment of the present invention.

With reference to FIG. 12, an explanation will be given below about a seventh embodiment.

In the seventh embodiment, changeover information is set to an outside of an LSI and received via a communication network to allow switchings to be made. As a control method there are a method for notifying a CPU 202 of changeover information via a communication controller to operate a control logic 212 and a method for notifying changeover information from a communication controller directly from a control logic 212 to a control logic.

FIG. 12 shows a method for setting changeover information via a communication network. A ROM 301 is of such a type as to store changeover information of all LSI's for use in a system and the changeover information is notified to the LSI (303 to 305) via the communication network 310. Transceivers 306 to 309 allow the connection of the transceivers 306 to 309 to the communication circuit 310. The changeover information, being at a single place, achieves the easiness with which the system control is performed. And the system, even if being varied, can be readily dealt with this situation.

Eighth Embodiment

Figure 13:
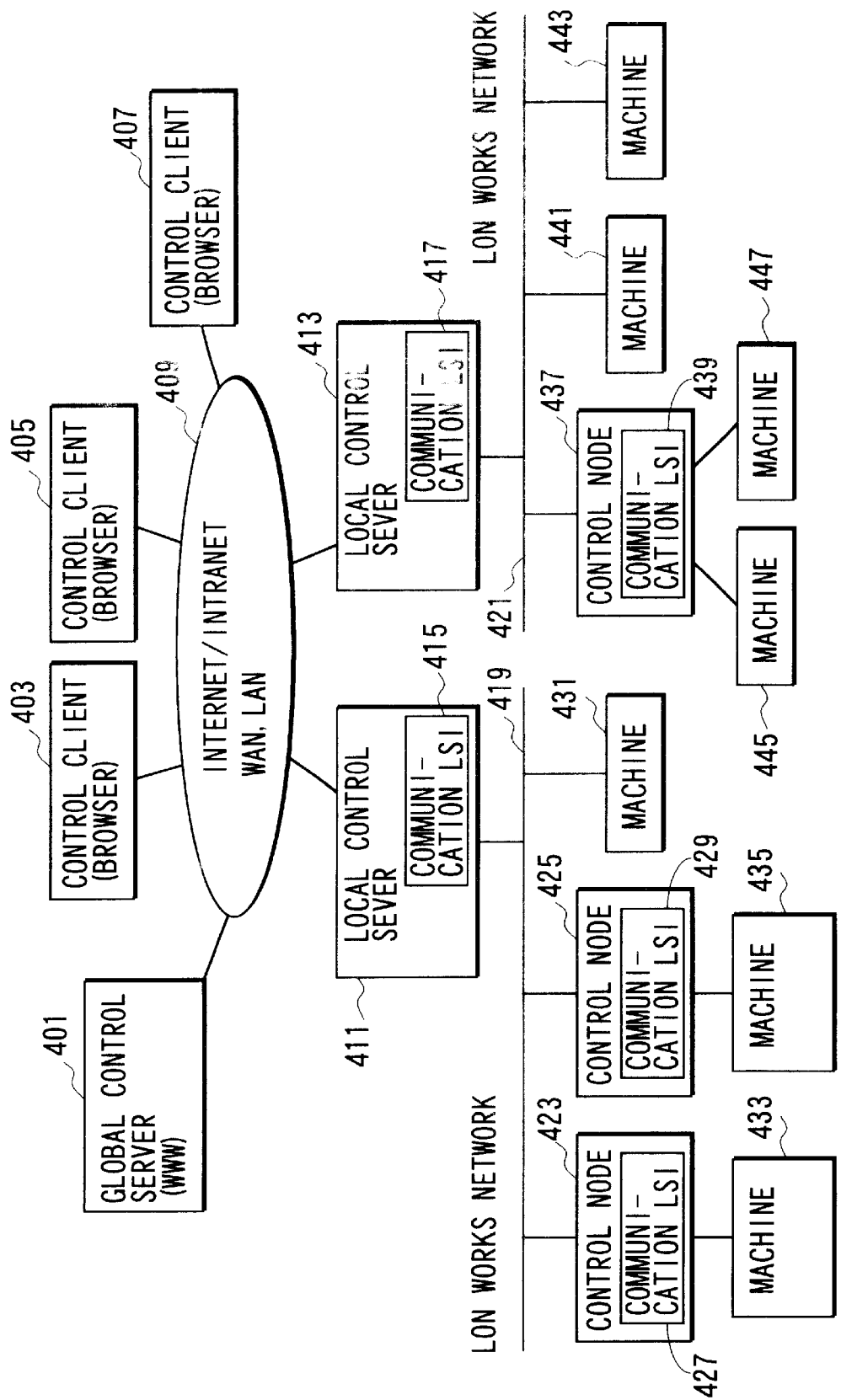
FIG. 13 is a block diagram showing a distributed control network system according to an eighth embodiment of the present invention.

FIG. 13 is a block diagram showing one form of a distribute control network system. As shown in FIG. 13, a global control server 401 and control clients 403, 405 and 407 are connected to an information system network 409. The information system network 409 constitutes, for example, an internet/intranet, WAN (Wide Area Network), LAN (Local Area Network), etc., and a communication protocol, such as a TCP/IP, etc., is adopted. Local control servers 411, and 413 are connected to the information system network 409. Local control servers 411, 413 are connected to control system networks 419, 421, such as LONworks Network developed by, for example, Echelon Corporation (U.S.A.). the local control servers 411 and 413 include communication LSIs 415 and 417, respectively. The communication LSIs 415 and 417 allow communication of the LONworks Network as well as the information system network 409.

A control nodes 423, 425 and machine 431 are connected to the control system network 413. Communication LSIs 427 and 429 are incorporated in the control nodes 423 and 425, respectively, which are connected to machines 433 and 435, respectively. The machines 421, 433 and 435, each, comprise, for example, a sensors and actuators (for illumination, switch, motor, etc.). The communication LSIs 427 and 429 allow communication to be made to the local control servers via the LONworks Network.

Similarly, a control node 437 and machines 441, 443 are connected to a control system network 417. The control node 437 contains a communication LSI 439. The control node 439 is connected to machines 445 and 447. The machines 447, 445, 445, 447, each, comprise a sensor and actuators (for illumination, switch, motor). The communication LSI 439 allows communication to be made to the local control servers via the LONworks Network.

Figure 14:
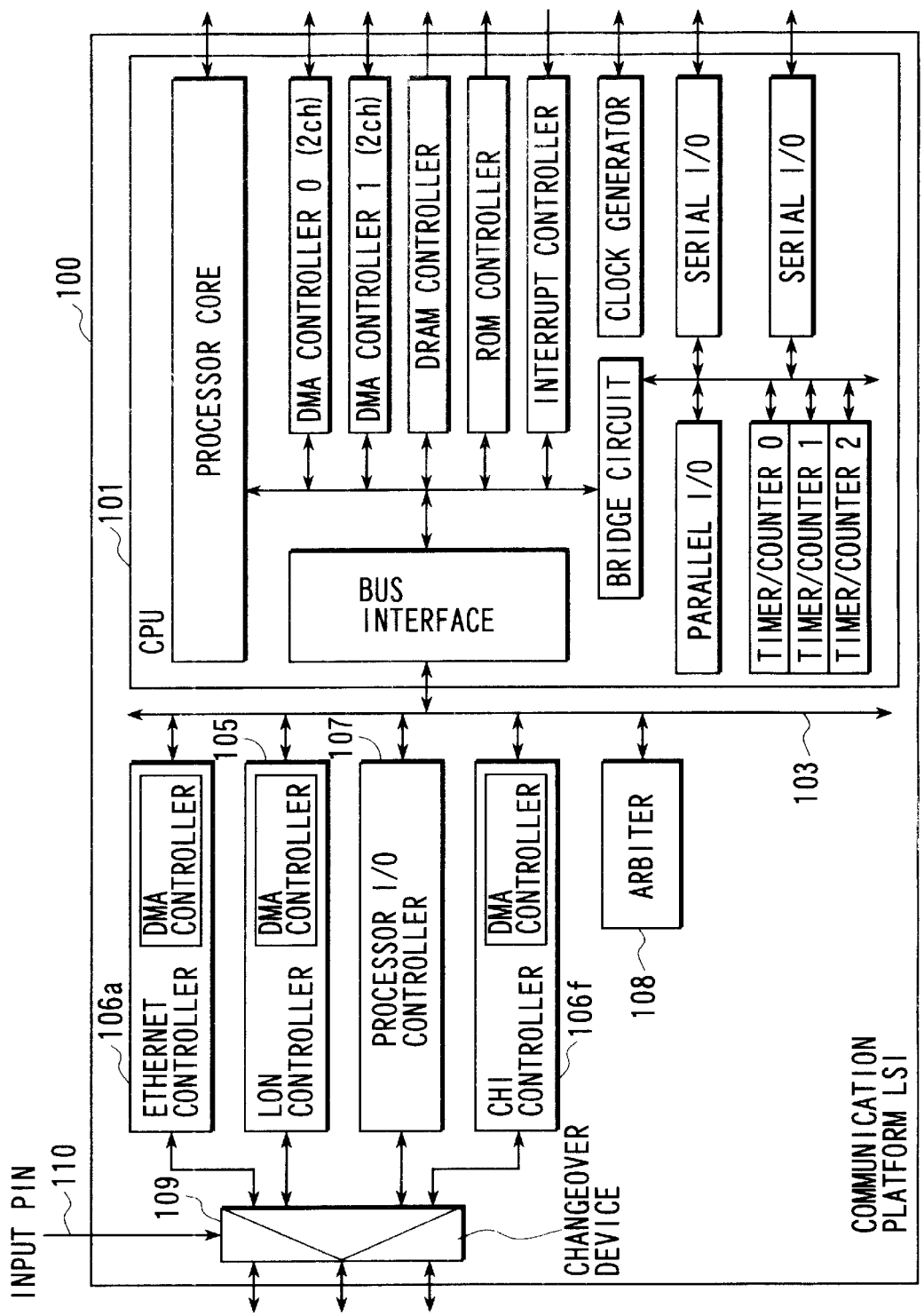
FIG. 14 is a block diagram showing, in detail, a communication LSI used in the distributed control network system shown in FIG. 13.

The communication LSIs 415, 417, 427, 425 and 439 constitute an electronic circuit applicable to a gateway for allowing a connection to be made between the control system network adopting a dedicated communication protocol, such as LONwork Network and the information system network adopting a standard communication protocol, such as Ethernet and TCP/IP, and also constitute an electronic circuit applicable to the control nodes 423, 425 and 437 for monitoring/driving the sensors and actuators and, as shown in FIG. 14, constitute a one-chip electronic circuit for allowing communication to be performed among a CPU 101, Ethernet controller 105a, LON controller 105, processor I/O controller 107, CHI controller 106F and arbiter 108 via a bus 103.

The CPU 101 processes information for controlling a protocol conversion and apparatuses and includes DMA controllers, DRAM controller, ROM controller, interrupt controller, serial I/O, parallel I/O, timer/counter, etc.

The Ethernet controller 106a constitutes a communication controller for controlling the transmission/reception of data via the Ethernet. The LON controller 105 constitutes a communication controller for controlling the transmission/reception of data via the LONwork Network. The processor I/O controller 107 constitutes a communication controller for monitoring/drive-controlling the sensors and actuators. The CHI controller 106f constitutes a communication controller for controlling the transmission/reception of data via the WAN. And the arbiter 108 performs exclusive control between the CPU 101 and the respective communication controller (106a, 105, 107, 106f).

A changeover device 109 is provided in the communication LSIs 415, 417, 427, 429 and 439. The changeover 109 selects, from a plurality of communication controllers, an effectively functioning communication controller. Stated in more detail, in the case where application is made to the local controller servers 411, 413, selection is made between the LON controller 105 and the Ethernet controller 106a (when the information system network 2 is the Ethernet) or selection is made between the LON controller 105 and the CHI controller 106f (when the information system network 2 is the WAN). In the case where application is made to the control nodes 423, 425, 439, selection is made between the LON controller 105 and the processor I/O controller 107.

Based on a signal input from the input pin 110 the changeover device 109 selects, out of a plurality of communication controllers, an effectively functioning communication controller and, in this case, a switching is performed to a corresponding one of those I/O pins for which the respective communication controllers (106a, 105, 107 and 106f) are used. By doing so, in the eighth embodiment, the communication LSIs 415, 417, 427, 429, 439 can be used among the network apparatuses (local control servers 411, 413 and control nodes 423, 425, 437) shown in FIG. 13.

Figure 15:
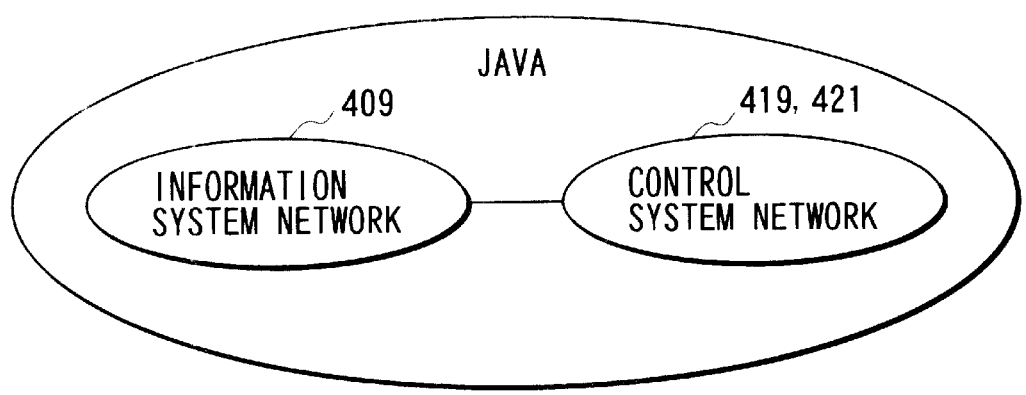
FIG. 15 is a concept diagram showing a state in which the control-system network of the eighth embodiment and information-system network are integrated in a software level.

A program for allowing the CPU 101 is the communication LSI 100 to effect protocol conversion and process information for controlling the associated apparatuses is created by a general-purpose program language, such as Java, the same as a program run on a computer connected to an information system network 409, such as the global control server 401 and control clients 403, 405, 407. By doing so, as shown in FIG. 15 for instance, the information system network 409 and the control system networks 419, 421 can be integrated in a software level. This enables the global control server 401, control clients 403, 405, etc. to conduct communication to the local control servers 411, 413 as well as the control nodes 423, 425, 437 in the same procedure. As a result, it is possible to seamlessly effect communications between the global control server 401 and the control clients 403, 405, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distributed control network system comprising:
   a control client connected to a first communication network with a first communication protocol;
   a plurality of event-driven distributed control microcomputers connected to a second communication network with a second communication protocol; and
   a local control server connected to the first communication network with the first communication protocol and adapted to control the distributed control microcomputers with the second communication protocol via the second communication network, the local control server having a communication large scale integrated circuit, the communication large scale integrated circuit comprising:
      at least one set of one or more input/output pins each set to which transceivers for the first and second communication networks can be connected;
      controllers which control the transceivers with the first and second communication protocols, the number of the controllers being larger than the number of sets of input/output pins; and
      a selector connected between the sets of input/output pins and the controllers and which selects the controllers in accordance with the transceivers connected to the sets of input/output pins.

2. A system according to claim 1, wherein the first communication protocol comprises at least one communication protocol for an information system network and the second communication protocol comprises a communication protocol for a control system network.

3. A large scale integrated circuit (LSI), comprising:
   at least one s et of one or more input/output pins each set to which a peripheral device can be connected, the perpheral devices of different types;
   controllers which control the peripheral devices of different types which can be connected to the one or more of the sets of input/output pins;
   a selector connected between the one or more sets of input/output pins and the controllers and which selects one or more of the controllers based on the type of peripheral device connected to a set of input/output pin and connects the selected controllers to the set of input/output pins to which the peripheral device is connected; and
   a selection information set unit configured to set selection information;
   wherein peripheral devices connected to the sets of input/output pins include one or more transceivers each of which is connected to a communication network and each of which uses one of a plurality of communication protocols;
   wherein the one or more controllers include one or more communication controllers each of which supports one or more communication protocols;
   wherein the selector selectively connects the controller that supports the communication protocol of a transceiver connected to a set of input/output pins;
   wherein the selector selects controllers in accordance with the set selection information; and
   wherein the selection information set unit includes a memory which stores the selection information and the setting of the selection information set unit is performed by loading the selection information from the memory when a system including the LSI is powered ON.

4. A large scale integrated circuit (LSI), comprising:
   at least one set of one or more input/output pins each set to which a peripheral device can be connected the peripheral devices of different types;
   controllers which control the peripheral devices of different types which can be connected to the one or more sets of input/output pins;
   a selector connected between the one or more sets of input/output pins and the controllers and which selects one or more of the controllers based on the type of peripheral device connected to a set of input/output pins and connects the selected controllers to the set of input/output pins to which the peripheral device is connected; and
   a selection information set unit configured to set selection information;
   wherein peripheral devices connected to the sets of input/output pins include one or more transceivers each of which is connected to a communication network and each of which uses one of a plurality of communication protocols;
   wherein the one or more controllers include one or more communication controllers each of which supports one or more communication protocols;

wherein the selector selectively connects the controller that supports the communication protocol of a transceiver connected to a set of input/output pins;

wherein the selector selects controllers in accordance with the set selection information; and wherein the selection information set unit interfaces a memory via the communication network connected to the sets of input/output pins of the LSI via the transceiver, and wherein the memory stores the selection information and the setting of the selection information set unit is performed by loading the selection information from the memory when a system including the LSI is powered ON.

* * * * *

UNITED STATES PATENT AND TRADEMARK OFFICE
CERTIFICATE OF CORRECTION

PATENT NO. : 6,728,252 B1
DATED : April 27, 2004
INVENTOR(S) : Kato

It is certified that error appears in the above-identified patent and that said Letters Patent is hereby corrected as shown below:

Column 10,
Line 7, change "s et" to -- set --.
Line 17, change "pin" to -- pins --.

Signed and Sealed this

Sixth Day of July, 2004

JON W. DUDAS
*Acting Director of the United States Patent and Trademark Office*